Figure 2:
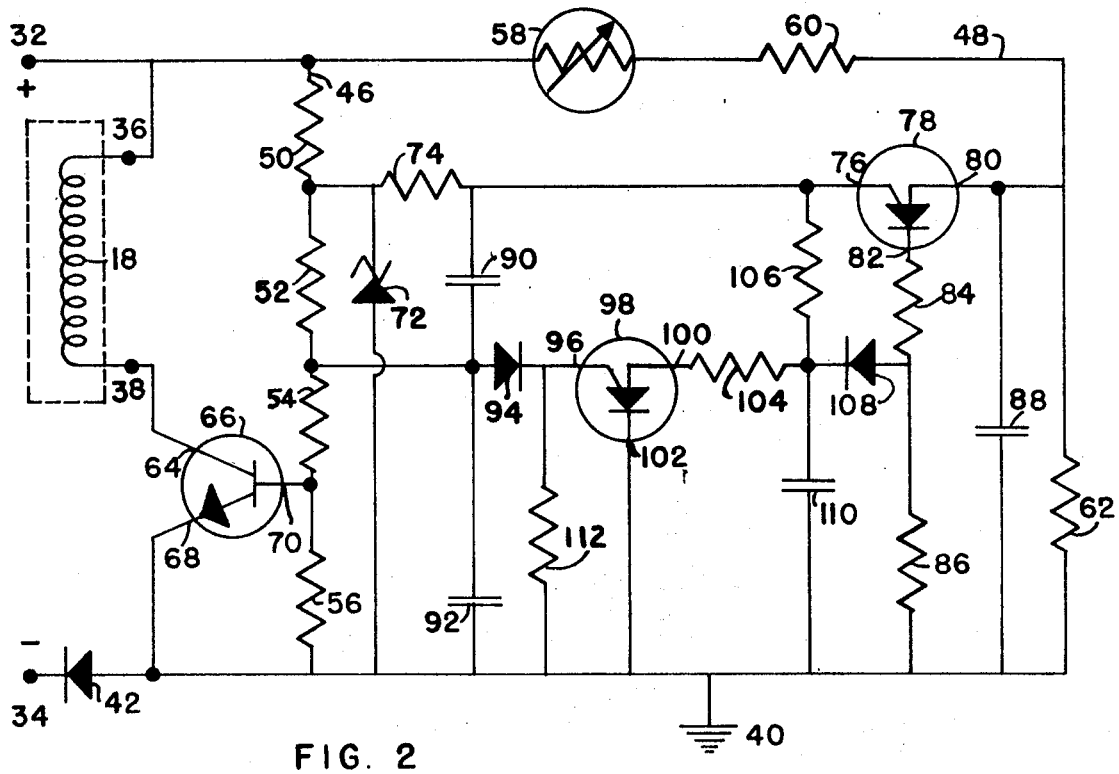

United States Patent
Ballman

[15] 3,652,916
[45] Mar. 28, 1972

[54] BATTERY CHARGE PROGRAMMERS
[72] Inventor: Gray C. Ballman, St. Louis County, Mo.
[73] Assignee: Chargematic, Inc.
[22] Filed: May 28, 1970
[21] Appl. No.: 41,423

[52] U.S. Cl.................................320/35, 320/40, 307/252 F
[51] Int. Cl..............................................................H02j 7/04
[58] Field of Search ...................317/31; 320/35, 37, 39, 40, 320/DIG. 1, DIG. 2; 307/252 F

[56] References Cited

UNITED STATES PATENTS

| | | | |
|---|---|---|---|
| 3,217,225 | 11/1965 | Gottlieb et al. | 320/31 UX |
| 3,445,745 | 5/1969 | Frezzolini | 320/49 X |
| 3,281,638 | 10/1966 | Crawford | 320/DIG. 1 UX |
| 3,300,704 | 1/1967 | McMillen | 320/DIG. 1 UX |
| 3,217,226 | 11/1965 | Strain | 320/DIG 1 UX |
| 2,307,576 | 1/1943 | De Croce | 320/34 |
| 2,783,430 | 2/1957 | Bower | 320/31 |
| 3,453,519 | 7/1969 | Hunter, Jr. | 320/39 X |

Primary Examiner—William M. Shoop, Jr.
Attorney—Joseph A. Fenlon, Jr.

[57] ABSTRACT

The disclosure relates to Battery Charge Programmers which permit automatic charging of batteries by regulating the overcharge time of the battery being charged and which contain an overriding charge time limiter, to limit the total amount of time the battery is charged, independently of the state of charge.

6 Claims, 2 Drawing Figures

PATENTED MAR 28 1972 3,652,916

INVENTOR
GRAY C BALLMAN

BY Joseph A Fenlon
ATTORNEY

BATTERY CHARGE PROGRAMMERS

This invention relates to Battery Charge Programmers.

In present day battery charging operations, a need exists for a device which will permit batteries to be charged automatically overnight, while no superintending personnel are present. To prevent damage to the charger in the event the battery will not accept a charge, the device must be capable of turning off the charger after a relatively fixed period of time after charging operations begin. To prevent damage to the battery in the event the battery accepts the charge in a short period of time, the device must be capable of turning off the charger within a relatively shorter period of time.

It is the object of this invention to provide a programmer which answers the above described need.

With the above and other objects in view, which will become immediately apparent upon the reading of this specification, my invention resides in the unique and novel form, arrangement, construction and combination of the various parts and elements hereinafter described and claimed.

IN THE DRAWINGS

Figure 1:
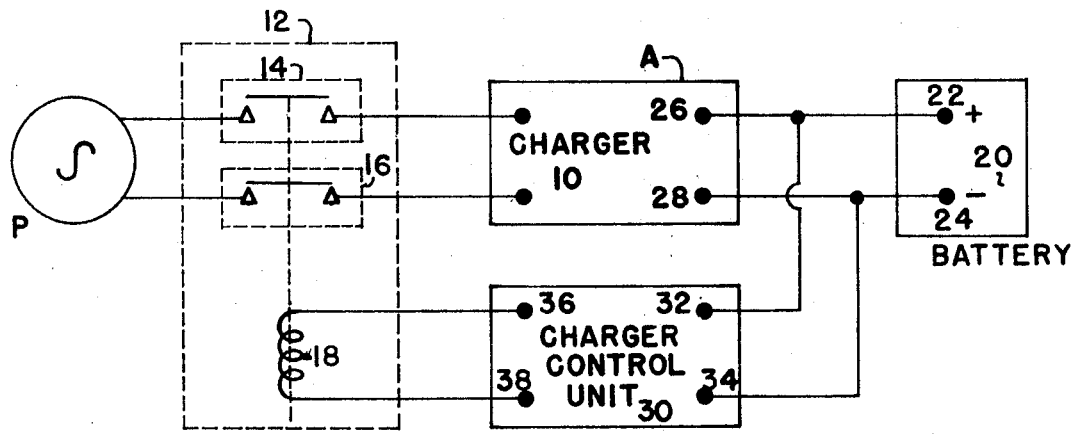

FIG. 1 is a schematic block diagram of a typical battery charging system employing my invention; and FIG. 2 is a detailed electrical schematic of the programmer comprising my invention.

Referring now in more detail, and by reference character to the drawings, which illustrate a preferred embodiment of my invention, A designates a battery charging network comprising a source of external power P, which supplies power to a conventional battery charger 10 through a relay 12 having two sets of normal open relay contacts 14, 16, which are closed by activation of a relay coil 18, all in the conventional manner; a battery 20 having a positive terminal 22 and a negative terminal 24, which are respectively connected to charger output terminals 26 and 28; and a programmer 30 which includes a pair of voltage sensing terminals 32, 34, respectively connected to the battery terminals 22, 24, and also includes a pair of relay activation terminals 36, 38, which are connected to the relay coil 18, all as shown in FIG. 1.

Referring now to FIG. 2, the programmer 30 derives all of its operating power from the battery 20 being charged. Positive bias is applied directly to the unit from the battery terminal 22 through sensing terminal 32 and the common ground 40 is connected to the negative terminal 24 through a blocking diode 42 and sensing terminal 34.

Connected between the sensing terminal 32 and the ground 40 are a relay control network 44, a first voltage divider network 46, and a second voltage divider network 48. The first voltage divider network 46 comprises four resistors 50, 52, 54 and 56 all connected in series. The second voltage divider network 48 comprises a thermistor 58 and two resistors 60, 62, also connected in series. The relay control network 44 comprises relay coil 18 which is connected to the collector 64 of a transistor 66, having an emitter 68 connected to ground 40 and a base 70 connected to the common connection of resistors 54 and 56.

Connected to the common connection of the resistors 50 and 52 on the first voltage divider network 46 is a Zener 72, and a resistor 74, the other end of the Zener 72 being connected to ground 40, and the other end of the resistor 74 being connected to the gate lead 76 of a first programmable unijunction transistor 78 (hereinafter referred to as P.U.T. 78), which also includes an anode 80 and a cathode 82. The anode 80 is connected to the common connection of the resistors 60 and 62 in the second voltage divider circuit 48, and the cathode 82 is connected to ground 40 through two resistors 84, 86, in series. A first capacitor 88 is connected between the anode 80 and the ground 40, a second capacitor 90 is connected between the gate lead 76 of the P.U.T. 78 and the common connection of the resistors 52 and 54 in the first voltage, and a third capacitor 92 is connected between the common connection of the resistors 52 and 54 and the ground 40, all for purposes presently more fully to appear.

Also connected to the common connection of the resistors 52 and 54 through a blocking diode 94 is the gate lead 96 of a second P.U.T. 98 also having an anode 100 and a cathode 102. The cathode 102 is connected directly to the ground 40. The anode 100 is connected through a resistor 104 to the common connection of a resistor 106 (the other end of which is connected to the gate lead 76 of the P.U.T. 78), a blocking diode 108 (the other end of which is connected to the common connection of the resistors 84 and 86), and a fourth capacitor 110, the other end of which is connected to ground 40. A resistor 112 is also connected between the gate lead 96 and ground 40.

It should be here noted that the operation of the invention, which will be hereinafter described, is achieved by the unique characteristic of the P.U.T.'s to turn on at a precisely predetermined voltage.

The operation of the invention may be best understood by explaining the operation when a weak battery 20 is connected across terminals 32, 34, for charging. When the battery 20 is connected, the voltage drops across the resistors 52, 54, and 56 will be controlled by the Zener 72 and the transistor 66 will go into conduction causing current to flow through the relay coil 18 actuating the relay 12. This causes operating power to be supplied to the charger 10 from the source P and charging power to be supplied from the charger 10 to the battery 20.

As the battery 20 is charged, its terminal voltage will continue rising. The magnitude of the various components of the second voltage divider circuit 48, including the thermistor 58 which compensates for temperature variations, have been preselected to establish a voltage at the anode 80 which will turn on the P.U.T. 78 when the terminal voltage of battery 20 is at a level which indicates the battery 20 is fully charged. At this point, both the P.U.T. 78 and the transistor 66 will be in simultaneous conduction, and the battery 20 will continue to charge until the voltage across the capacitor 110 attains a predetermined level which will cause the P.U.T. 98 to go into conduction. When the P.U.T. 98 goes into conduction, the voltage drop across resistors 54 and 56 will decrease substantially, the transistor 66 will go out of conduction, the relay coil 18 will deenergize, and power to the charger 10 will be cut off, stopping the flow of charging current from the charger 10 to the battery 20. Even with the charger 10 turned off, the power supplied by the battery 20 will keep the P.U.T. 98 in conduction, once conduction commences.

The operation of the P.U.T. 98 is controlled by two complementary, but independent circuits, both of which determine the charge across the capacitor 110. In the first circuit, the voltage across the zener 72 will cause the capacitor 110 to charge through the resistors 74 and 106. Preferably the magnitudes of the resistor 106 and the capacitor 110 will be selected to establish an RC time constant of at least several hours duration. As the voltage across the capacitor 110 slowly increases, the P.U.T. 98 will gradually attain its turn-on voltage and conduction will commence, independently of any other circuit. This first circuit provides a protection override which will prevent a dead or extremely weak battery 20 from being charged indefinitely.

The second circuit which affects the charge of the capacitor 110 is the cathode circuit of the P.U.T. 78 which includes the resistors 84 and 86. As the current flows through the resistors 84 and 86, the voltage drop across the resistor 86 is applied to the capacitor 110 through the diode 108. Although the voltage drop across resistor 86 should never reach the turn on voltage of P.U.T. 98, it should be apparent that the time required for the capacitor 110 to charge through the resistor 106 will be greatly diminished by the transfer of the voltage through the diode 108, which commences once the battery 20 reaches the fully charged condition, and increases as the battery 20 is overcharged. By preselecting the magnitudes of the resistors 84 and 86, the overcharge time can thus be regulated to a fixed period of time after the full charge condition.

As can be seen from the above, my invention provides a charger control unit with regulated overcharge characteristics, and a protective override circuit which will limit total operating time of the charger. Since precise timing accuracy is not required, standard components may be used.

It should be understood that changes, alterations and modifications in the form, construction, arrangement and combination of the various parts may be made and substituted for those herein shown and described without departing from the operation and principles of my invention.

Having thus described my invention, what I claim and desire to secure by Letters Patent is stated in the following claims:

1. A battery charge programming device for use with a battery charger and a battery, said programming device comprising first voltage sensing means for automatically switching on the supply of charging current from the battery charger to the battery at the time a battery is connected to the charging terminals of the charger, cutoff means for automatically switching off the supply of charging current after the charging current has been switched on for a predetermined period of time, and a second voltage sensing means for reducing the amount of elapsed charging time between switching on and switching off if the battery becomes charged prior to the elapse of the predetermined period of time, said first voltage sensing means including a first voltage divider network operatively connected to the charging terminals of the charger, semiconductor means operatively connected to the charging terminals of the charger and to the first voltage divider network in such manner that it will go into conduction when a battery is connected to the charging terminals of the charger, and switching means for supplying charging current from the charger to the battery while the semiconductor means is in conduction, said cutoff means including a first programmable unijunction transistor having a first anode, a first cathode and a first gate operatively connected to the first voltage divider network in such manner that a substantially constant voltage exists between the first gate and the first cathode when the first transistor is not in conduction, and in such further manner that the voltage existing between the first anode and first cathode is determined by the amount of charge developed in a first capacitor, and first resistive means for gradually, over a predetermined period of time, transferring from the first voltage divider network to the first capacitor a voltage charge sufficient to place the first transistor in conduction, and said semiconductor means being operatively connected to the first voltage divider network in such manner that when the first transistor goes into conduction, the voltage supplied to the semiconductor from the first voltage divider network will be substantially reduced and the semiconductor means will go out of conduction, thereby cutting off the supply of charging current from the battery charger to the battery.

2. The device of claim 1 in which the first transistor is connected to the first voltage divider network in such manner that said first transistor utilizes battery power to remain in conduction once conduction has started.

3. The device of claim 1 wherein the second voltage sensing means a second programmable unijunction transistor having a second gate, a second anode and a second cathode, said second gate being connected to a substantially constant voltage source, said second anode being connected to a second voltage divider network which applies a certain percentage of the battery terminal voltage to the second anode, and said second cathode being connected to a third voltage divider network which is also connected, through a blocking diode to the first capacitor for purposes of transferring a voltage from the third voltage divider network to the first capacitor when the second transistor goes into conduction, thereby reducing the time required for the first capacitor to charge.

4. A battery charge programming device comprising:
a pair of sensing terminals;
first voltage responsive switching means for causing charging current to flow to a battery when said battery is connected across the sensing terminals;
Zener means for establishing a point of substantially constant voltage above ground when said battery is connected across the sensing terminals;
a first programmable unijunction transistor including a first gate and also including a first anode and a first cathode;
a first voltage divider network extending between the point of constant voltage and ground and also being connected at an intermediate point to the first gate;
a first capacitor connected at one end to the first anode through a first resistor and connected at the other end to ground;
said first cathode being also connected to ground;
a second resistor of substantial magnitude connected to the ungrounded end of the first capacitor and to the point of constant voltage whereby the first capacitor will slowly develop an increasing charge through the second resistor;
second voltage responsive means for deactivating the switching means thereby causing charging current to stop flowing to the battery when the charge across the first capacitor has attained sufficient magnitude to cause conduction in the first programable unijunction transistor;
and a second programmable unijunction transistor having a second gate and also having a second anode and a second cathode;
the second gate being connected to the point of constant voltage and the second cathode and the second anode being connected to the sensing terminals in such manner that the second programmable unijunction transistor will go into conduction when the terminal voltage of the battery attains a predetermined magnitude;
and means for decreasing the amount of time necessary for the first capacitor to develop a charge sufficient to turn on the first programmable unijunction transistor when the second programmable unijunction transistor is conducting.

5. The device of claim 4 wherein the means for decreasing the amount of time necessary for the first capacitor to develop a charge comprises a cathode resistor in the cathode circuit of the second transistor and coupling means for transfering the potential across said cathode resistor to the first capacitor.

6. The device of claim 5 wherein the cathode resistor is sized to transfer a potential to the first capacitor which is less than the turn on voltage of the first transistor, whereby the first capacitor will continue to charge while the second transistor is conducting, and the battery will continue to be charged until such time as the first transistor goes into conduction.

* * * * *